United States Patent
Kato

(10) Patent No.: US 9,896,025 B2
(45) Date of Patent: Feb. 20, 2018

(54) MOTORCYCLE POSITION LAMP ATTACHMENT STRUCTURE

(71) Applicant: Kawasaki Jukyogyo Kabushiki Kaisha, Hyogo (JP)

(72) Inventor: Hideyuki Kato, Akashi (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 166 days.

(21) Appl. No.: 14/724,670

(22) Filed: May 28, 2015

(65) Prior Publication Data

US 2015/0258929 A1 Sep. 17, 2015

Related U.S. Application Data

(63) Continuation of application No. PCT/JP2013/084038, filed on Dec. 19, 2013.

(30) Foreign Application Priority Data

Dec. 25, 2012 (JP) .................. 2012-280904

(51) Int. Cl.
*B60Q 1/26* (2006.01)
*B62J 6/00* (2006.01)
(Continued)

(52) U.S. Cl.
CPC ......... *B60Q 1/2661* (2013.01); *B60Q 1/0035* (2013.01); *B60Q 1/0041* (2013.01);
(Continued)

(58) Field of Classification Search
CPC .......... B62J 6/00; B62J 6/005; B60Q 1/0035; B60Q 1/2661; B60Q 1/28; B60Q 1/0041; B62K 19/40
See application file for complete search history.

(56) References Cited

U.S. PATENT DOCUMENTS 6,158,279 A * 12/2000 Saiki ................ G01P 1/026
324/166
7,314,297 B2 1/2008 Kitamura et al.
(Continued)

FOREIGN PATENT DOCUMENTS

CN 101275728 1/2008
CN 101654131 2/2010
(Continued)

OTHER PUBLICATIONS

Extended and Supplementary Search Report dated Aug. 3, 2016 for Corresponding European Patent Application No. 13868427.9 (8 pages).
(Continued)

*Primary Examiner* — Karabi Guharay

(57) ABSTRACT

A position lamp mounting structure (32) is provided separately from a support structure for a headlamp. The position lamp mounting structure (32) includes a top bridge (41) for supporting an upper portion of a front fork assembly (9), a handle holder (33) for sandwiching a handlebar (34) between it and the top bridge (4), a lamp holder (37) provided in the handle holder (33), and a lamp unit (40) fitted to the lamp holder (37). The lamp unit (40) includes a position lamp (44) built therein.

8 Claims, 7 Drawing Sheets

(51) Int. Cl.
  *B60Q 1/28* (2006.01)
  *B62K 19/40* (2006.01)
  *B60Q 1/00* (2006.01)
(52) U.S. Cl.
  CPC .................. *B60Q 1/28* (2013.01); *B62J 6/00* (2013.01); *B62K 19/40* (2013.01)

(56) References Cited

U.S. PATENT DOCUMENTS

| | | | |
|---|---|---|---|
| 7,695,173 | B2 | 4/2010 | Ota et al. |
| 7,802,907 | B2 | 9/2010 | Uemura et al. |
| 8,134,456 | B2 | 3/2012 | Osugi et al. |
| 8,746,774 | B2 | 6/2014 | Yasuhara et al. |
| 2006/0056191 | A1* | 3/2006 | Uemura ............... B60Q 1/0035 362/473 |
| 2006/0109670 | A1 | 5/2006 | Kitamura et al. |
| 2008/0239738 | A1 | 10/2008 | Ota et al. |
| 2009/0237231 | A1 | 9/2009 | Osugi et al. |
| 2011/0317441 | A1 | 12/2011 | Yasuhara et al. |

FOREIGN PATENT DOCUMENTS

| | | |
|---|---|---|
| CN | 101723040 | 9/2010 |
| CN | 102530138 | 4/2012 |
| CN | 102310899 | 11/2012 |
| EP | 1661798 | 10/2005 |
| EP | 1974997 | 2/2008 |
| EP | 2230162 | 9/2010 |
| EP | 2399809 | 6/2011 |
| JP | 2008-273499 | 11/2008 |
| JP | 2009-226965 | 10/2009 |
| JP | 2010-132267 | 6/2010 |
| JP | 2010-215052 | 9/2010 |
| JP | 2011-076958 | 4/2011 |
| JP | 2012-121526 | 6/2012 |
| JP | 2012-176695 | 9/2012 |

OTHER PUBLICATIONS

First Office Action dated Nov. 11, 2016 for Corresponding Chinese Patent Application No. 201380067903.5 with English Translation of the Search Report attached to the Office Action (6 pages).

Decision of Grant Issued Aug. 16, 2016 for Corresponding Japanese Patent Application No. 2012-280904 (3 pages).

PCT Application No. PCT/JP2013/084038 International Preliminary Report on Patentability dated Jun. 30, 2015, 5 pages.

PCT/JP2013/084038 International Search Report dated Mar. 25, 2014, 1 page.

Second Office Action dated May 11, 2017 for Corresponding Chinese Patent Application No. 201380067903.5 with English Translation of the Search Report attached to the Office Action (7 pages).

* cited by examiner

MOTORCYCLE POSITION LAMP ATTACHMENT STRUCTURE

CROSS REFERENCE TO THE RELATED APPLICATION

This application is a continuation application, under 35 U.S.C § 111(a) of international application No. PCT/JP2013/084038, filed Dec. 19, 2013, which claims priority to Japanese patent application No. 2012-280904, filed Dec. 25, 2012, the entire disclosure of which is herein incorporated by reference as a part of this application.

BACKGROUND OF THE INVENTION

Field of the Invention

The present invention relates to a position lamp mounting structure in a motorcycle, by which a position lamp is mounted on the motorcycle separately from a headlamp.

Description of Related Art

The motorcycle generally has a headlamp and a position lamp fitted to a front portion of a motorcycle body framework. In most cases, those lamps are conventionally accommodated within a lamp unit which is in turn mounted on a front fairing. Although it does not pertain to a position lamp, the patent document 1 listed below discloses a motorcycle in which a motorcycle turn signal lamp system is mounted on a front fork assembly of the motorcycle separately from the headlamp mounted on a bottom bridge in the front fork assembly.

PRIOR ART LITERATURE

Patent Document 1 JP Laid-open Patent Publication No. 2009-226965

It has however been found that accommodation of the positon lamp within the lamp unit together with the headlamp results in increase of the size of the lamp unit, which in turn leads to the increase of the shape of the front fairing on which the lamp unit is mounted. In view of this, in order to reduce the size of the front fairing, an attempt has been made to employ a structure in which the position lamp is supported separately from the head lamp that is mounted on the front fairing, but this brings about a problem associated with selection of the site at which the position lamp is adequately installed. The patent publication 1 listed below discloses a technique in which left and right turn signal lamps are mounted on left and right front fork tubes forming the front fork assembly, but this known technique cannot be applied to the structure in which a single position lamp is mounted at a motorcycle intermediate portion of the motorcycle.

SUMMARY OF THE INVENTION

In view of the foregoing, the present invention is aimed to provide a positon lamp mounting structure for a motorcycle, in which the position lamp can be suitably installed separately from a support structure for the head lamp.

In order to accomplish the foregoing object, the present invention provides a position lamp mounting structure for a motorcycle which is provided separately from a support structure for a headlamp. The position lamp mounting structure includes a top bridge to support an upper portion of a front fork assembly, a handle holder to sandwich a handlebar between it and the top bridge, a lamp holder provided in the handle holder, and a lamp unit fitted to the lamp holder. The lamp unit includes a position lamp built therein.

According to the position lamp mounting structure for a motorcycle discussed above, since the lamp holder is provided in the handle holder for sandwiching between it and the top bridge, the position lamp can be provided at a motorcycle body intermediate portion suitable as a single position lamp mounting position. With the lamp unit mounted on this lamp holder, the lamp unit can be fitted at a position above the headlamp by means of a mounting structure that is separate from a support structure for the head lamp. Accordingly, the lamp unit can have a freely selected shape regardless of the shape of a front fairing and the specification of the head lamp and, on the other hand, the degree of freedom of the shape and the structure of any one of the front fairing and the headlamp increases.

In a preferred embodiment of the present invention, the lamp holder may be formed integrally with the handle holder. The formation of the lamp holder integrally with the handle holder is nothing other than to change the shape of the existing handle holder to a lamp holder integrated type and, therefore, without incurring the increase of the number of component parts used, the lamp unit can be fitted to the motorcycle body separately from the headlamp.

In another preferred embodiment of the present invention, the lamp unit may be removably fastened to the lamp holder through a lamp bracket. Fastening of the lamp unit to the lamp holder makes it possible to reduce the size of the lamp unit as compared with the provision of a mounting area at the lamp unit, and, therefore, a replacement work of the lamp unit can be facilitated, accompanied by the reduction in replacement cost.

In a further preferred embodiment of the present invention, the lamp unit may include a lamp main body to support the position lamp and a lens cover mounted on a front surface of the lamp main body, and the lamp holder may include left and right arm portions to cover side portions of the lamp main body from laterally outside. With the lamp unit so constructed as described above, when the lamp unit is fitted to the lamp holder, the side portions of the lamp main body excluding a frons surface where the lens cover is mounted are covered by the left and right arm portions from the outside and, therefore, the exterior look of the motorcycle body front portion is improved.

Where the lamp holder includes the left and right arm portion as discussed above, a harness of the lamp unit is preferably led out from a gap between the left and right arm portions. Since the harness is usually drawn from a rear portion of the lamp unit, drawing the harness out from the space between the left and right arm portions in a downward direction makes it possible to allow the harness to be smoothly drawn out to the outside of the lamp unit without making the harness diverted on a grand scale.

In a still further preferred embodiment of the present invention, the lamp holder may have an open space defined in an upper portion thereof, in which case the use is made of a covering body to cover the open space. According to the formation of the open space in the upper portion of the lamp holder, before the covering body is fitted, required works including screwing and wiring can be accomplished easily relative to the lamp holder and the lamp unit through the open space. In addition, while the open space is covered by the covering body upon completion of those works, and, therefore, the exterior look of the motorcycle body front portion is improved.

Where the covering body covering the open space of the lamp holder is fitted to the lamp holder, the lamp holder and the covering body may cooperate with each other to define an exposure opening through which a light emitting surface in the lamp unit is exposed forwardly. By so doing, the lamp unit has its light emitting surface exposed forwardly from the exposure opening that is formed by the lamp holder and the covering body, and the area except for the light emitting surface is covered by the lamp holder and the covering body. Accordingly, the motorcycle body front portion can have its exterior look improved.

In a still yet preferred embodiment of the present invention, the position lamp mounting structure for the motorcycle may also include an instrument unit removably fastened to the lamp holder. According to this feature, since the instrument unit is, together with the lamp unit, fitted to the lamp holder, the structure is simplified to such an extent as to eliminate the use of a member for supporting the instrument unit.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
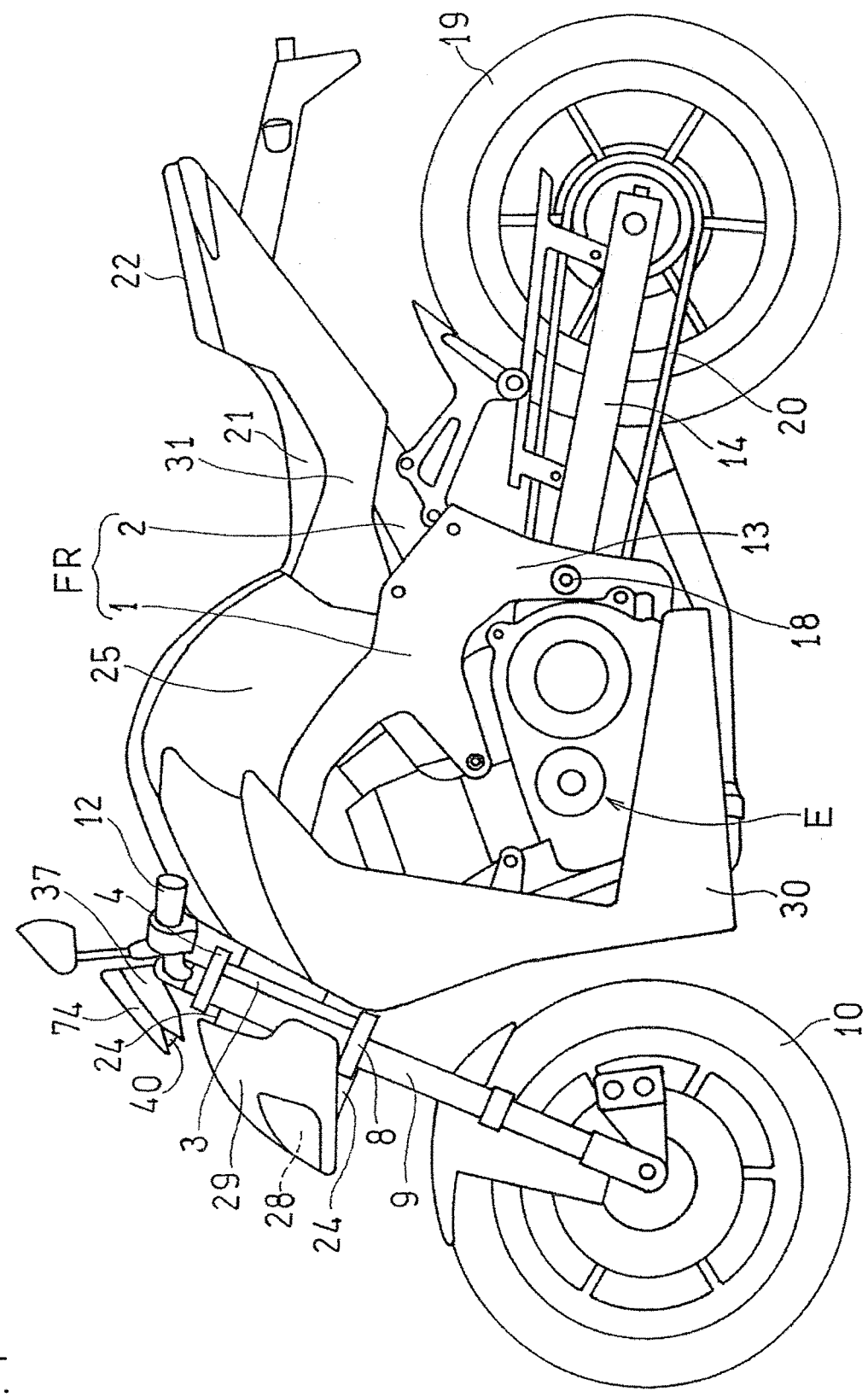
FIG. 1 is a side view of a motorcycle equipped with a positon lamp mounting structure designed in accordance with a preferred embodiment of the present invention.

Hereinafter, a preferred embodiment of the present invention will be described with particular reference to the accompanying drawings. In particular, FIG. 1 illustrates a motorcycle utilizing a position lamp mounting structure designed in accordance with the preferred embodiment of the present invention. The illustrated motorcycle includes a motorcycle body framework FR made up of a main frame 1, forming a front half portion of the motorcycle body framework FR, and a rear frame 2 forming the remaining rear half portion of the motorcycle body framework FR. The main frame 1 has a front end to which a head pipe 3 is fitted, and a top bridge 4 and a bottom bridge 8 are fitted to a steering shaft (not shown) which is rotatably inserted in this head pipe 3. Left and right front fork members 9 forming respective parts of a front fork assembly are supported by those bridges 4 and 8. The front fork assembly has a lower end portion by which a front wheel 10 is rotatably supported, and a handle 12 is mounted on the top bridge 4 on an upper end portion of the front fork assembly.

The main frame 1 has a rear end portion provided with a swingarm bracket 13, and a swingarm 14 is supported by the swingarm bracket 13 for pivotal movement up and down about a pivot pin 18 that is inserted through a front end portion of the swingarm 14. A rear wheel 19 is rotatably supported by a rear end portion of the swingarm 14. A motorcycle combustion engine E is supported by a lower intermediate portion of the main frame 1, and this combustion engine E is operable to drive the rear wheel 19 through a power transmission mechanism 20 such as, for example, a drive chain disposed on a left side of the motorcycle body.

A rider's seat 21 and a fellow passenger's seat 22, positioned rearwardly of the rider's seat 21, are supported by the rear frame 2. A fuel tank 25 is fitted at an upper portion of the main frame 1, that is, a motorcycle body upper portion between the handlebar 12 and the rider's seat 21. A headlamp device 28 is supported by the top bridge 4 and the bottom bridge 8 through upper and lower support structures 24, and a front fairing 29 made of a resinous material is supported by the headlamp device 28 so as to cover the headlamp device 28 from above, below and lateral sides. A side fairing 30 made of a resinous material is mounted rearwardly of the front fairing 29 so as to cover a region ranging from a lower portion of the fuel tank 25 to a portion forwardly of the combustion engine E and a lower portion of the combustion engine E. A region below the rider's seat 21 and the fellow passenger's seat 22 is covered from laterally outer sides by a rear covering 31.

A lamp unit 40 having a position lamp built therein is disposed above the headlamp device 28. This lamp unit 40 is fitted to the top bridge 4 by a position lamp mounting structure that pertains to the preferred embodiment of the present invention that will be described hereinafter. This mounting structure is employed separately from a support structure 24 for the headlamp device 28.

Figure 2:
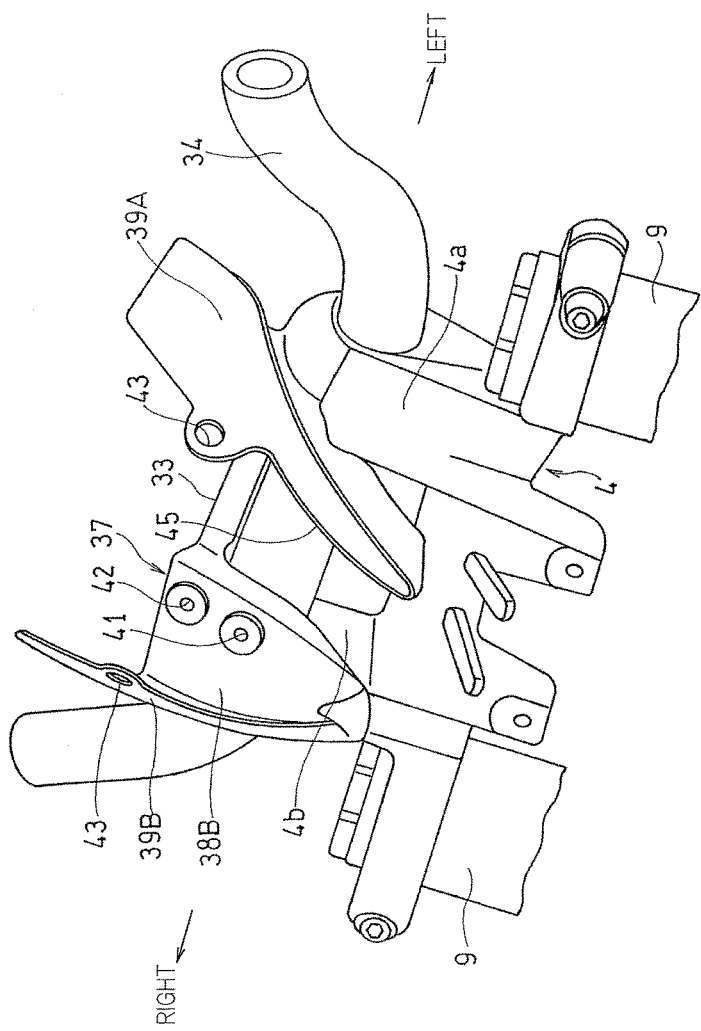
FIG. 2 is a perspective view showing, on an enlarged scale, how a lamp holder, forming a part of the position lam mounting structure, is mounted on a top bridge.

Referring to FIG. 2, the top bridge 4 supports upper end portions of the left and right front fork members 9 and 9, and a handlebar 34, forming a part of the handle 10, is sandwiched between left and right support arm portions 4a, 4b of the top bridge 4 and a handle holder 33 that is a member separate therefrom. A lamp holder 37 forming a main body of the positon lamp mounting structure referred to above is formed integrally with the handle holder 33. It is, however, to be noted that the lamp holder 37, which is a member separate from the handle holder 33, may connect with the handle holder 33.

Figure 3:
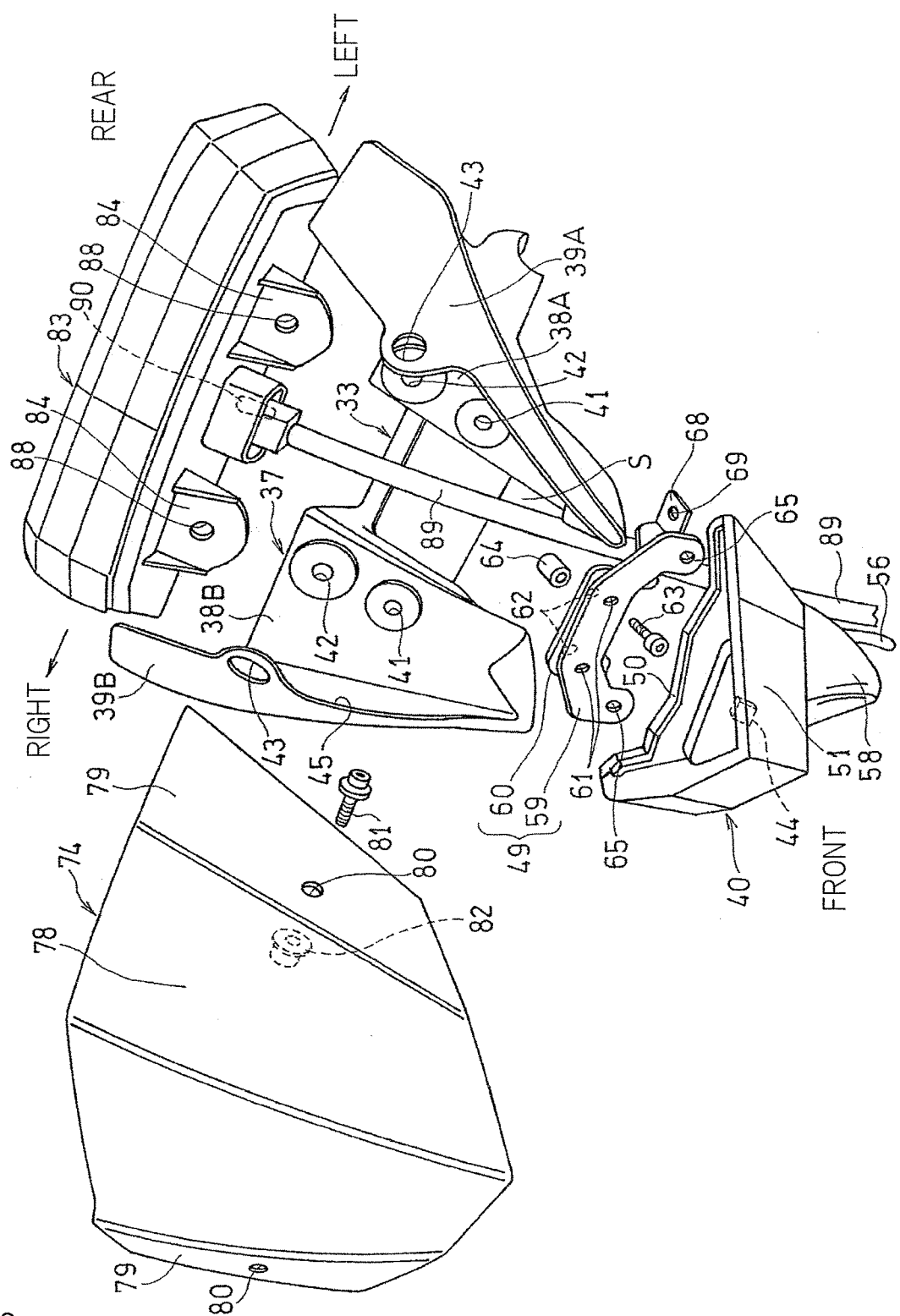
FIG. 3 is an exploded view showing the position lamp mounting structure.

The lamp holder 37 has left and right arm portions 39A and 39B formed therein. Left and right holder base portions 38A and 38B, from which the left and right arm portions 39A and 39B are formed so as to extend, are formed integrally with the handle holder 33, and two lower side (front side) threaded holes 41 and 41 and two upper side (rear side) threaded holes 72 and 72 are formed in the respective left and right holder base portions 38A and 38B. Also, the left and right arm portions 39A and 39B are formed with respective mounting holes 43. As best shown in FIG. 3, the lamp unit 40 having the position lamp 44 such as, for example, a light emitting diode (LED) built therein is fitted to this lamp holder 37 through a lamp bracket 49.

Figure 4:
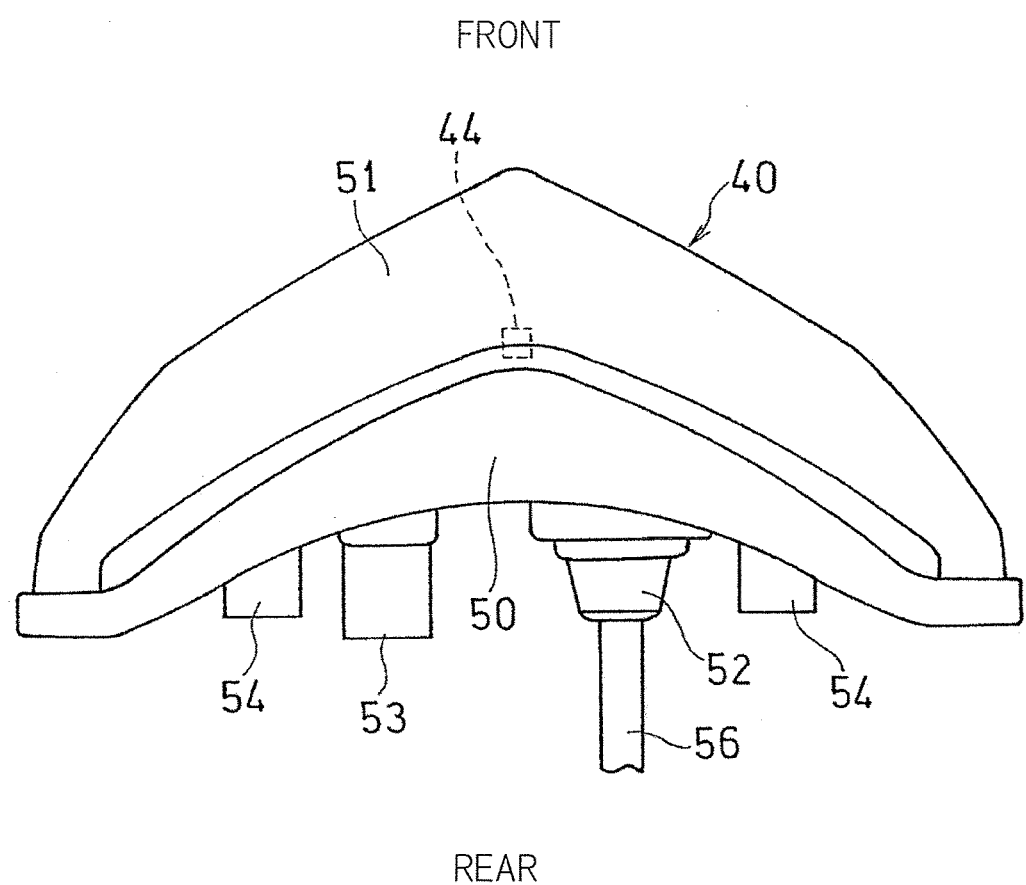
FIG. 4 is a top plan view of a lamp unit employed in the position lam mounting structure.
Figure 6:
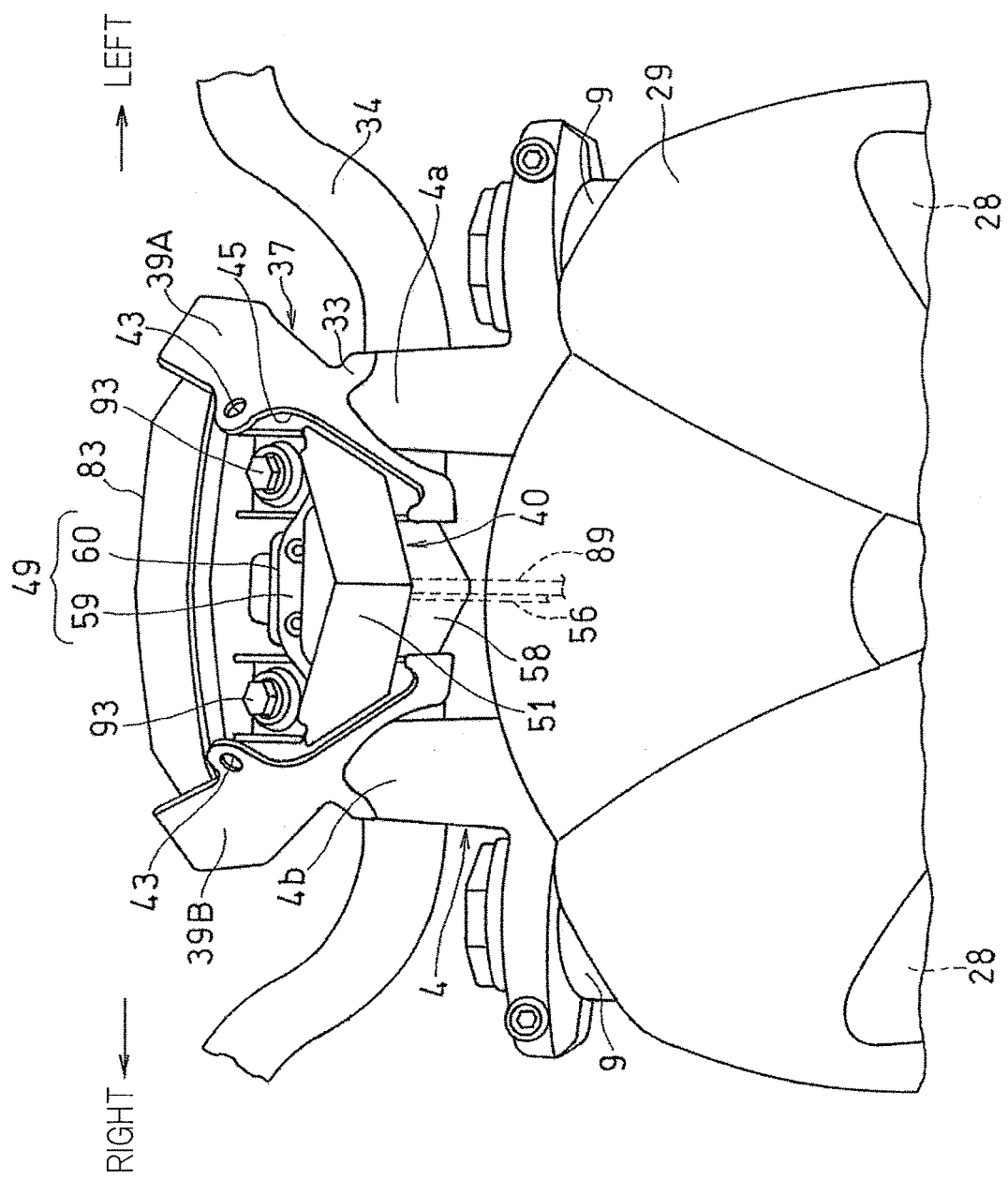
FIG. 6 is a front elevational view showing such condition as shown in FIG. 5.

As shown in FIG. 4, the lamp unit 40 includes a lamp main body 50 to support the position lamp 44 and a lens cover 51 mounted on a front surface of the lamp main body 50. The lamp main body 50 includes a harness lead-out portion 52, through which a harness 56 is led out from a rear surface, a vent hole forming portion 53 for heat dissipating purpose, a pair of threadingly bored bosses 54 and 54 so as to protrude outwardly, and a covering piece 58 (as best shown in FIG. 6) so as to protrude downwardly.

As shown in FIG. 3, the lamp socket 49 includes a bracket front portion 59 and a bracket rear portion 60 that are separate from each other, and the bracket front portion 59 and the bracket rear portion 60 are formed with pairs of connecting holes 61, 61, 62 and 62, which are respectively defined therein at associated intermediate portions thereof. Those connecting holes 61, 61, 62 and 62 are communicated with each other when in an overlapped condition. The bracket front portion 59 is formed with two mounting holes 65 defined respectively in bent and downwardly extending opposite end portions.

Figure 5:
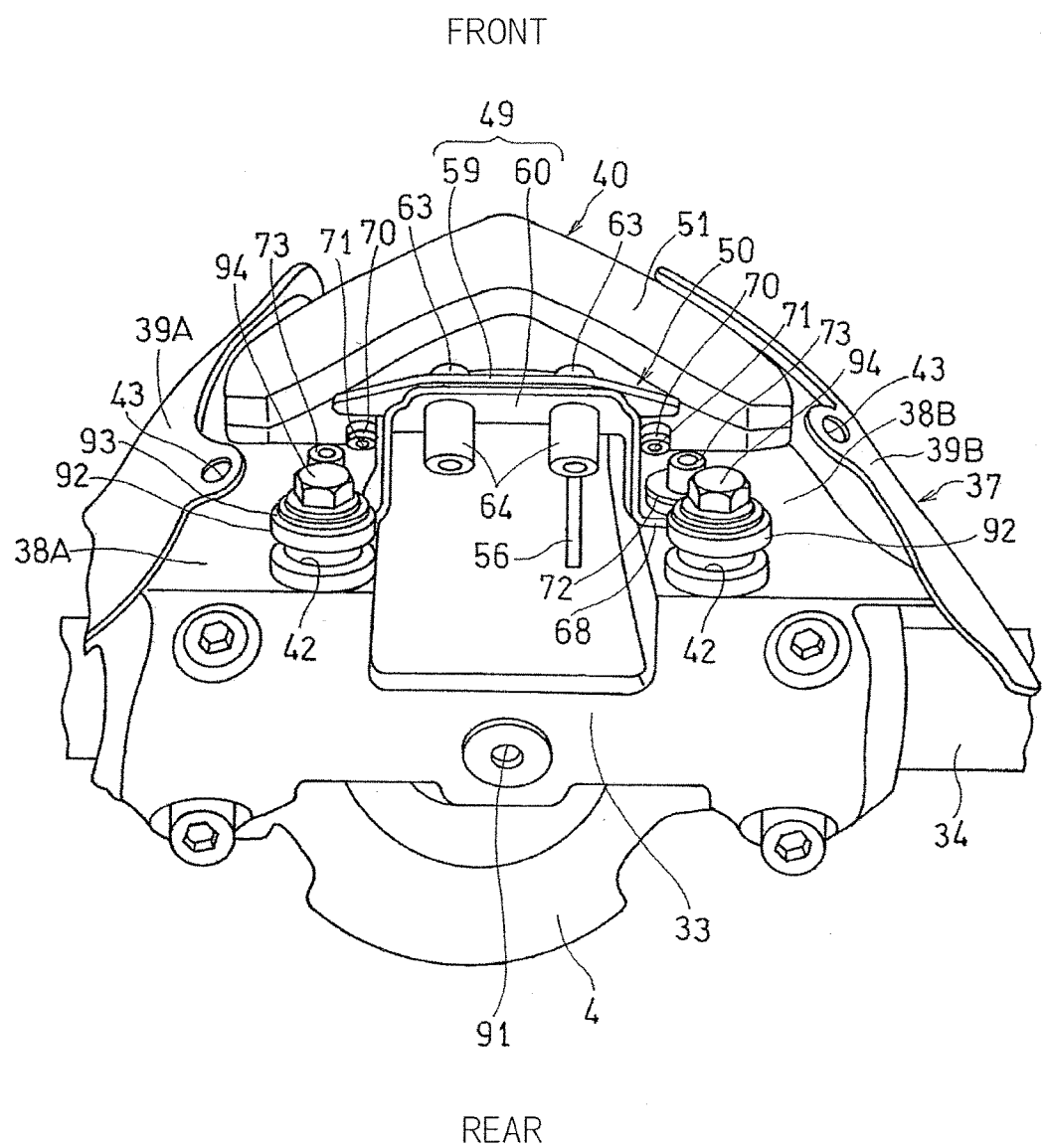
FIG. 5 is a perspective view showing, as viewed from above, the position lamp mounting structure with a covering body removed.

The bracket front portion 59 and the bracket rear portion 60 are connected together when bolts 63 are passed through the connecting holes 61, 61, 62 and 62 from front while in the overlapped condition until those bolts 63 are threaded into respective rubber nuts 64 on a rear side, thereby forming the lamp bracket 49 referred to previously as shown in FIG. 5 which illustrates a perspective view as viewed from top. To this lamp bracket 49, the lamp unit 40 is fitted with a structure which will be described below.

In other words, in a condition in which the pair of the threadingly bored bosses 54 in the lamp unit 40 shown in FIG. 4 are inserted into the mounting holes 65 defined respectively in the opposite end portions of the bracket front portion 59 shown in FIG. 3, the lamp unit 40 is fitted to the lamp bracket 49 when bolts 71 are threaded into the threadingly bored bosses 54 (shown in FIG. 4) through washers 70 shown in FIG. 5. The lamp bracket 49 with the lamp unit 40 fitted thereto in the manner described above are fixed to the lamp holder 37. Specifically, mounting holes 69 and 69, provided in the two mounting holes 68 and 68 in the opposite end portions of the bracket rear portion 60 shown in FIG. 3, are aligned with the left and right lower threaded holes 41 and 41 in the lamp holder 37, and bolts 73 are threaded into the lower threaded holes 41 and 41 through respective washers 72 shown in FIG. 5, thereby to fix the lamp bracket 49 to the lamp holder 37. In other words, the lamp unit 40 is removably fitted to the lamp holder 37 through the lamp bracket 49.

As shown in FIG. 3, beside the lamp unit 40 an instrument unit 83 is fitted to the lamp holder 37. This instrument unit 83 includes left and right support pieces 84 and 84, each having an insertion hole 88 defined therein at a location corresponding to the corresponding upper threaded hole 42 of the lamp holder 37, and the left and right support pieces 84 and 84 are integrally provided so as to protrude forwardly. A harness 89 for power supply and control purposes is drawn outwardly from a position intermediate between the two support pieces 84 and 84. Also, the instrument unit 83 includes an engagement pin 90 so as to protrude forwardly from an intermediate portion lower portion.

The instrument unit 83 is positioned relative to the lamp holder 37 when the engagement pin 90 is inserted into an engagement hole 91 of the handle holder 33 of FIG. 5 in which illustration of the instrument unit 83 is omitted, and, while positioned in this manner, the left and right insertion holes 88 and 88 of the instrument unit 83, as shown in FIG. 5, are aligned with the left and right upper threaded holes 42 and 42 of the lamp holder 37. As shown in FIG. 5, each of the insertion holes 88 and 88 has a rubber grommet 92 inserted therein and, bolts 94 are inserted into a center hole of the corresponding grommet 92 through respective washers 93, so as to be threaded into the upper threaded holes 42 and 42. By so doing, the instrument unit 83 shown in FIG. 3 is removably fastened to the lamp holder 37.

The harness 89 drawn outwardly from the instrument unit 83 is, together with the harness 56 drawn outwardly from the harness lead-out portion 52 of the lamp unit 40, drawn out downwardly through a gap S delimited between the left and right arm portions 39A and 39B of the lamp holder 37. Those harnesses 56 and 89 are, as shown in FIG. 6, concealed by the covering piece 58 of the lamp unit 40 and the front fairing 29 therebelow and are therefore invisible from front.

Both of the lamp unit 40 and the instrument unit 83 are disposed in the lamp holder 37 at a site between the left and right arm portions 39A and 39B. The interval between the left and right arm portions 39A and 39B is a vacant space 45. Accordingly, after the handle holder 33 formed integrally with the lamp holder 37 has been fitted to the top bridge 4, the lamp unit 40 and the instrument unit 83 can be assembled in the lamp holder 37 by inserting them from the space 45 into the inside of the arm portions 39A and 39B.

As shown in FIG. 3, the space 45 between the left and right arm portions 39A and 39B is subsequently covered and consequently closed by a covering body 74. The covering body 74 has its opposite side portions bent downwardly to provide respective mounting portions 79 and 79 adapted to overlap respective outer side faces of the left and right arm portions 39A and 39B of the lamp holder 37, and those mounting portions 79 and 79 are formed therein with respective insertion holes 80 and 80. This covering body 74 are fitted to the arm portions 39A and 39B of the lamp holder 37 so as to be held over the lamp holder 37 to enclose the space 45 above the lamp holder 37. In specific, after the insertion holes 80 in the mounting portion 79 has been so positioned as to align with collared nuts (nuts with collars) 82 then inserted into the mounting holes 43 in the arm portions 39A and 39B, bolts 81 are inserted into the insertion holes 80 from outside and then threaded into the collared nuts 62.

Figure 7:
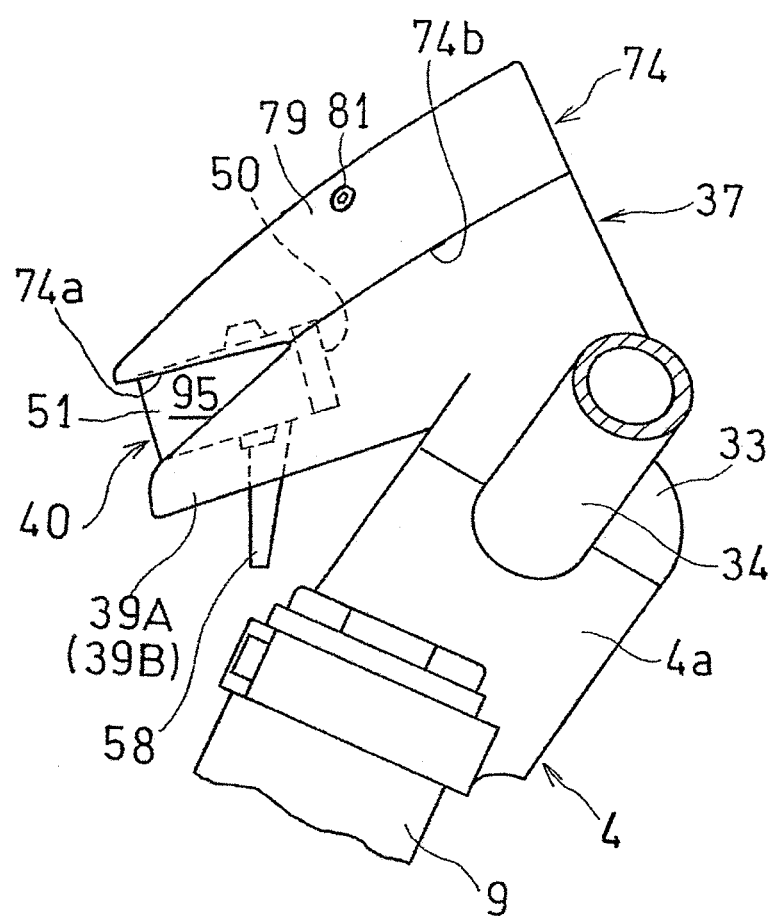
FIG. 7 is a side view showing the position lamp mounting structure.

As shown in FIG. 7, the left and right arm portions 39A and 39B of the lamp holder 37 are so formed as to represent a tapered shape having such a gradient as to be inclined forwardly downwardly, and a front side lower tip end edge 74a of each of the mounting portions 79 of the covering body 74 is inclined at such a gradient as to extend forwardly upwardly from opposite side edges 74b. Accordingly, by the lamp holder 37 and the covering body 74 which are connected together, an exposure opening 95 of a shape flaring in a forward direction is formed. From this exposure opening 95, only the lens cover 51, which defines a light emitting surface of the lamp unit 40, is exposed forwardly, and the lamp main body 50 of the lamp unit 40 is covered by the arm portions 39A and 39B of the lamp holder 37 and the covering body 74. Therefore the lamp main body 50 is not visible from outside.

In this position lamp mounting structure, since the lamp holder 37 is provided in the handle holder 33 which sandwiches the handlebar 34 at a location between it and the top bridge 4, the lamp holder 37 can be suitably disposed at a motorcycle body intermediate portion which is suitable as a mounting position for the single position lamp 44. With the lamp unit 40 fitted to the lamp holder 37 as described above, the lamp unit 40 can be fitted at a position above the headlamp device 28 by means of the mounting structure that is separate from the support structure for the headlamp device 28. Accordingly, the lamp unit 40 can select the shape freely regardless of the shape of the front fairing 29 and the specification of the headlamp device 28. Also, the degree of freedom of the shape and the structure of any of the front fairing 29 and the headlamp device 28 are also increased.

Also, since the lamp holder 37 referred to above is formed integrally in the handle holder 33, it is sufficient to change the shape of the existing handle holder 33 to an lamp holder integrated type and, accordingly, without incurring the increase of the number of component part used, the lamp unit 40 can be fitted to the motorcycle body separately from the headlamp device 28.

In addition, since the lamp unit 40 is removably fastened to the lamp holder 37 through the lamp bracket 49, as compared with the case in which the lamp unit 40 is provided with a mounting portion at which it is mounted on the lamp holder 37, the lamp unit 40 can be compactized. Therefore, a replacement work of the lamp unit 40 can be eased and the replacement cost can be reduced.

Moreover, in the lamp unit 40, the lens cover 51 is mounted on the front surface of the lamp main body 50 which supports the position lamp 44, and the lamp holder 37 includes the left and right arm portions 39A and 39B for covering the lateral sides of the lamp main body 50 from outside. Accordingly, when the lamp unit 40 is fitted to the lamp holder 37, the lateral sides of the lamp main body 50, except for the front surface thereof on which the lens cover 51 is mounted, are covered by the left and right arms 39A and 39B of the lamp holder 37 from outside. Therefore, the exterior look of the motorcycle body front portion improved.

The harness 56 of the lamp unit 40 is led out from the space S delimited between the left and right arm portions 39A and 39B possessed by the lamp holder 37. Since this harness 56 is usually drawn from a rear portion of the lamp unit 40, drawing the harness 56 out from the spaces between the left and right arm portions 39A and 39B in a downward direction makes it possible to allow the harness 56 to be smoothly drawn out to the outside of the lamp unit 40 without making the harness 56 diverted on a grand scale.

Further, since the lamp holder 37 has the space 45 in an upper portion thereof and the covering body 74 covering this space 45 is fitted to the lamp holder 37, a required work such as, for example, screw fastening and wiring can be easily performed from this space 45 to the lamp holder 37 and the lamp unit 40 before the covering body 74 is fitted. In addition, since the space 45 is covered by the covering body 74 after the completion of the work, the exterior look of the motorcycle body front portion improves.

Furthermore, when the covering body 74 covering the space 45 of the lamp holder 37 is fitted to the lamp holder 37, only the lens cover 51, which is the light emitting surface of the lamp unit 40, is exposed forwards from the exposure opening 95 formed by the lamp holder 37 and the covering body 74, while the site except for the light emitting surface is covered by the lamp holder 37 and the covering body 74. Therefore, the exterior look of the motorcycle body front portion improves after all.

Finally, since the instrument unit 83 is too removably fitted to the lamp holder 37 along with the lamp unit 40, the structure can be simplified to such an extent as to eliminate the use of an uncalled-for a member for supporting the instrument unit 83.

While the preferred embodiment have been fully described with reference to the accompanying drawings, numerous changes and modifications thereof are obvious without departing from the gist of the present invention. Accordingly, such changes and modifications are to be equally understood as included within the scope of the present invention.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

4 . . . Top bridge
9 . . . Front fork assembly
29 . . . headlamp
33 . . . Handle holder
34 . . . Handlebar
37 . . . Lamp holder
39A, 39B . . . Arm portion
40 . . . Lamp unit
44 . . . Positon lamp
45 . . . Opening
49 . . . Lamp bracket
50 . . . Lamp main body
51 . . . Lens cover (Light emitting surface)
56 . . . Harness
74 . . . Covering body
83 . . . Instrument unit
95 . . . Exposure opening
S . . . Gap

What is claimed is:

1. A position lamp mounting structure for a motorcycle, which is provided separately from a support structure for a headlamp, the position lamp mounting structure comprising:
    a top bridge to support an upper portion of a front fork assembly;
    a handle holder to sandwich a handlebar between it and the top bridge;
    a lamp holder provided in the handle holder; and
    a lamp unit fitted to the lamp holder, the lamp unit having a position lamp built therein, wherein
    the top bridge has a support arm protruding upwardly from the top bridge, and
    the handlebar is sandwiched between the support arm and the handle holder.

2. The position lamp mounting structure for the motorcycle as claimed in claim 1, in which the lamp holder is formed integrally with the handle holder.

3. The position lamp mounting structure for the motorcycle as claimed in claim 1, in which the lamp unit is removably fastened to the lamp holder through a lamp bracket.

4. The position lamp mounting structure for the motorcycle as claimed in claim 1, in which the lamp unit comprises a lamp main body to support the position lamp and a lens cover mounted on a front surface of the lamp main body; and the lamp holder includes left and right arm portions to cover side portions of the lamp main body from laterally outside.

5. The position lamp mounting structure for the motorcycle as claimed in claim 4, in which a harness of the lamp unit is led out from a gap between the left and right arm portions.

6. The position lamp mounting structure for the motorcycle as claimed in claim 1, in which the lamp holder has an open space defined in an upper portion thereof and further comprising a covering body to cover the open space.

7. The position lamp mounting structure for the motorcycle as claimed in claim 6, in which the lamp holder and the covering body cooperate with each other to define an exposure opening through which a light emitting surface in the lamp unit is exposed forwardly.

8. The position lamp mounting structure for the motorcycle as claimed in claim 1, further comprising an instrument unit fastened to the lamp holder.

\* \* \* \* \*